United States Patent
Sugimura et al.

(10) Patent No.: US 7,216,782 B2
(45) Date of Patent: May 15, 2007

(54) DISPENSER FOR DISCHARGING LIQUID MATERIAL

(75) Inventors: Hiroyuki Sugimura, Kawasaki (JP); Satoshi Murata, Kawasaki (JP); Tetsuya Kida, Kawasaki (JP); Shota Makimoto, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 147 days.

(21) Appl. No.: 10/803,241

(22) Filed: Mar. 18, 2004

(65) Prior Publication Data

US 2004/0182887 A1    Sep. 23, 2004

(30) Foreign Application Priority Data

Mar. 20, 2003    (JP) .............................. 2003-078331

(51) Int. Cl.
*G01F 11/00*  (2006.01)
*B67D 5/042*  (2006.01)
*B65D 83/00*  (2006.01)

(52) U.S. Cl. ...................... 222/260; 222/389; 222/399

(58) Field of Classification Search ................ 222/389, 222/261, 258, 373, 399, 390, 386, 384, 372, 222/340, 335, 284, 256, 260–263
See application file for complete search history.

(56) References Cited

U.S. PATENT DOCUMENTS

| 2,134,735 | A | * | 11/1938 | Reinhold ..................... 222/262 |
| 2,737,022 | A | * | 3/1956 | Collins ........................ 137/593 |
| 3,186,597 | A | * | 6/1965 | Dick ............................ 222/30 |
| 3,353,537 | A | * | 11/1967 | Knox et al. .................. 604/143 |
| 3,952,919 | A | * | 4/1976 | Hansen et al. ................ 222/89 |
| 4,634,027 | A | * | 1/1987 | Kanarvogel ................. 222/380 |
| 4,826,050 | A | * | 5/1989 | Murphy et al. ............. 222/175 |
| 5,067,591 | A | * | 11/1991 | Fehlig ........................ 184/55.1 |
| 5,134,962 | A |   | 8/1992 | Amada et al. |
| 5,320,250 | A | * | 6/1994 | La et al. ......................... 222/1 |
| 5,570,815 | A | * | 11/1996 | Ramsay ....................... 222/95 |
| 5,681,507 | A |   | 10/1997 | Kazuma |
| 6,662,969 | B2 | * | 12/2003 | Peeler et al. .................... 222/1 |

FOREIGN PATENT DOCUMENTS

| JP | 01-249967 | 10/1989 |
| JP | 03-114565 | 5/1991 |
| JP | 08-323171 | 12/1996 |
| JP | 2000-329771 | 11/2000 |
| JP | 2001-144114 | 5/2001 |
| JP | 2002-229044 | 8/2002 |

* cited by examiner

*Primary Examiner*—Frederick C. Nicolas
*Assistant Examiner*—Melvin Cartagena
(74) *Attorney, Agent, or Firm*—Greer, Burns & Crain, Ltd

(57) ABSTRACT

A dispenser has a syringe having a nozzle at one end thereof and a plunger fitted in the syringe from the other end of the syringe. One end of a pipe is connected to a portion of the syringe between the one end and the other end of the syringe. A liquid material tank is connected to the other end of the pipe. The liquid material tank is arranged so that a level of the liquid material in the liquid material tank is higher than in the syringe. The dispenser can be used for drip injection method for producing a liquid crystal display device to stably drip droplets of a liquid crystal onto a substrate of a liquid crystal display device.

2 Claims, 6 Drawing Sheets

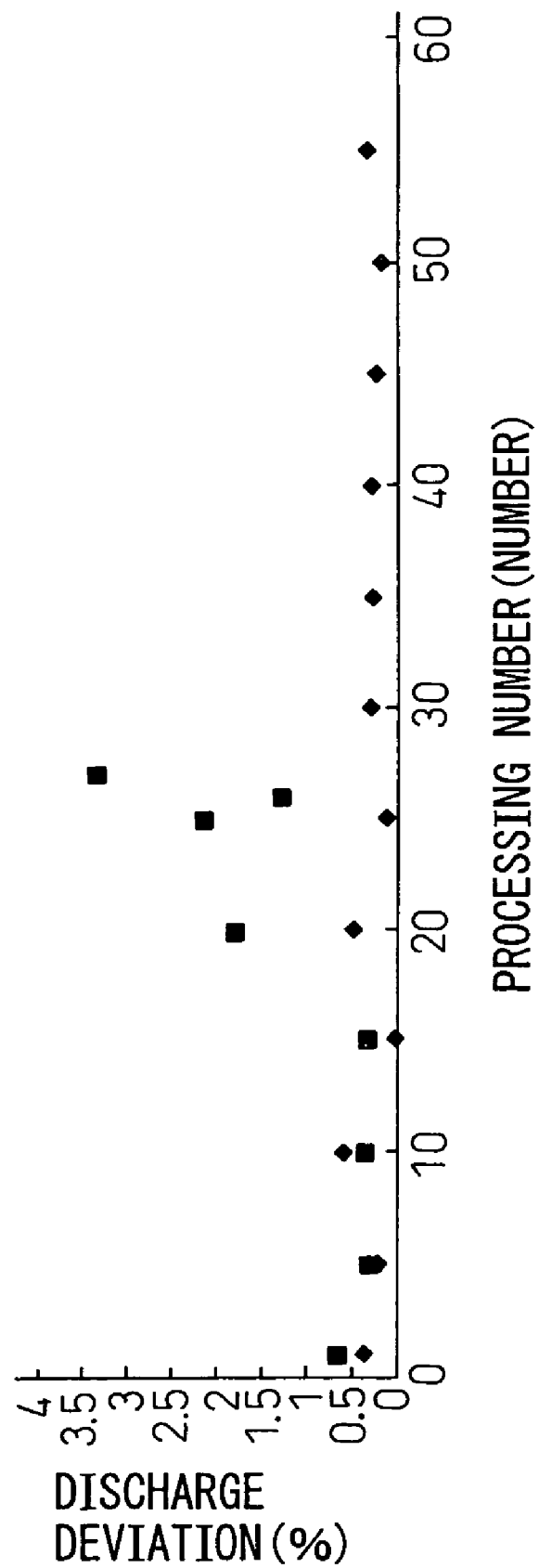

DISPENSER FOR DISCHARGING LIQUID MATERIAL

BACKGROUND OF THE INVENTION

1. Field of the Invention

The present invention relates to a dispenser for discharging a liquid material which is suitably used for a liquid crystal drip injection method, for example.

2. Description of the Related Art

A liquid crystal display device is composed of a pair of substrates and a liquid crystal inserted between the substrates. For example, one substrate is a TFT substrate on which TFTs are formed, and the other substrate is a color filter substrate on which a color filter is formed. On one substrate, an annular seal made of a light curable sealing agent is formed, and the annular seal is cured when it is irradiated with ultraviolet rays after the pair of substrates are bonded to each other. Liquid crystal is inserted into a region surrounded by the annular seal.

In the conventional method of manufacturing a liquid crystal display device, an injection hole is provided in the annular seal. After a pair of substrates are bonded to each other, the liquid crystal is injected from the injection hole provided in the annular seal in a vacuum chamber. After that, the injection hole provided in the annular seal is closed, and a liquid crystal panel composed of the pair of substrates is taken out from the vacuum chamber.

A method of manufacturing a liquid crystal display device, which is called a drip injection method, has been recently proposed (refer to Japanese Unexamined Patent Publication (Kokai) No. 2002-229044, for example). According to the drip injection method, an annular seal is formed on one of the substrates, and droplets of the liquid crystal are dripped in the annular seal. Then, the pair of substrates are bonded to each other in a vacuum chamber. According to the drip injection method, the manufacturing process can be simplified, and the manufacturing cost of a liquid crystal display device can be lowered.

In the drip injection method, in order to drip the liquid crystal onto the substrate, a dispenser for discharging a liquid material is used. The dispenser for discharging a liquid material includes a syringe having a nozzle at one end, and a plunger engaged in the syringe from the other end of the syringe. When the plunger is advanced in the syringe, droplets of the liquid crystal are ejected from the nozzle.

In the drip injection method used for manufacturing a liquid crystal display device, it is necessary to uniformly and stably discharge a small quantity of the liquid crystal from the dispenser. When the quantity of the liquid crystal discharged from the dispenser fluctuates, the thickness of a liquid crystal cell fluctuates and the quality of the display is deteriorated, and further bubbles (a vacuum layer) are generated and mixed in the liquid crystal. When bubbles and foreign objects are mixed in the liquid crystal in the syringe, the cell thickness locally fluctuates and further the liquid crystal is polluted. In order to avoid the occurrence of the above problems, it is necessary to supply a predetermined quantity of liquid crystal into the syringe without causing bubbles in the liquid crystal. It is also necessary to discharge a predetermined quantity of liquid crystal from the syringe each injection time without causing bubbles in the liquid crystals.

Not only in the dispenser for discharging a liquid material, which is used for the drip injection method of manufacturing a liquid crystal display device, but also in the syringe of the dispenser for discharging a liquid material, which is used for discharging another liquid material, when a quantity of a supplied liquid material becomes unstable, a quantity of a discharged liquid material also becomes unstable. Therefore, it is impossible to supply and discharge the liquid material stably. In the case where foreign objects are mixed in the liquid material or the liquid material itself is polluted, various problems may be caused depending on the use.

SUMMARY OF THE INVENTION

It is an object of the present invention to provide a dispenser for discharging a liquid material capable of stably discharging a liquid material without causing pollution.

A dispenser for discharging a liquid material, according to the present invention, comprises a syringe having a nozzle at one end thereof, a plunger engaged in the syringe from the other end of the syringe, a pipe connected to a portion of the syringe between the one end and the other end of the syringe, and a liquid material tank connected to the other end of the pipe, the liquid material tank being arranged so that a level of a liquid material in the liquid material tank is higher than the syringe.

According to this constitution, when the plunger is advanced in the syringe, droplets of liquid material (a liquid crystal) are discharged from the nozzle. When the plunger is retracted in the syringe, the liquid crystal is supplied from the liquid material tank into the syringe. As the liquid material tank is arranged in such a manner that a level of a liquid material in the liquid material tank is higher than the syringe, the liquid material can be smoothly supplied from the liquid material tank into the syringe without generating bubbles.

BRIEF DESCRIPTION OF THE DRAWINGS

The present invention will become more apparent from the following description of the preferred embodiments, with reference to the accompanying drawings, in which:

FIG. 10 is a view showing the relationship between the number of times of discharging a liquid material and the discharge deviation.

DESCRIPTION OF THE PREFERRED EMBODIMENTS

Figure 1:
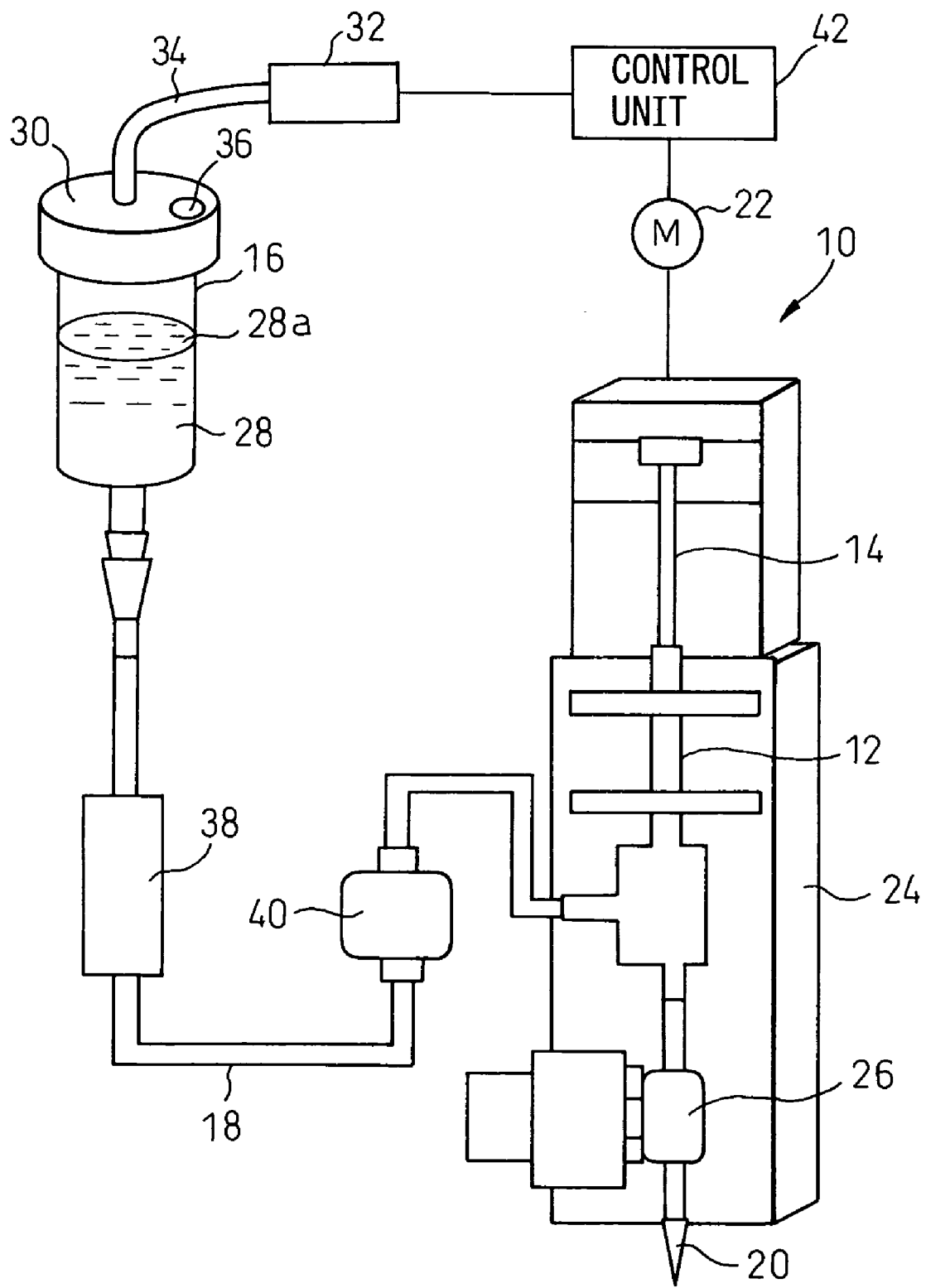
FIG. 1 is a view showing a dispenser for discharging a liquid material of an embodiment of the present invention.

Referring to the drawings, an embodiment of the present invention will be explained below.

FIG. 1 is a view showing a dispenser for discharging a liquid material of an embodiment of the present invention.

The dispenser 10 for discharging a liquid material includes a syringe 12, a plunger 14, a liquid material tank 16, and a pipe 18 connecting the syringe 12 with the liquid material tank 16. A nozzle 20 is provided at one end of the syringe 12, and the plunger 14 is fitted in the syringe 12 from the other end of the syringe 12.

The plunger 14 is driven by a pulse motor 22. The syringe 12 is arranged in a casing 24 together with the plunger 14. The pulse motor 22 and a motion transmitting mechanism are also arranged in the casing 24. A heater for heating the liquid material in the syringe 12 is arranged in the casing 24. Further, a discharge valve 26 is arranged at a position near the nozzle 20 of the syringe 12.

Liquid material 28 (for example, a liquid crystal) is put in the liquid material tank 16. The liquid material tank 16 is arranged so that the level 28a of the liquid material 28 in the liquid material tank is higher than the syringe 12. It is preferable that the bottom of the liquid material tank 16 is higher than the top of the syringe 12. Accordingly, when the liquid material 28 is supplied from the liquid material tank 16 into the syringe 12, no bubbles are mixed in the liquid material 28, and the liquid material 28 can be smoothly supplied.

The liquid material tank 16 includes a cap 30, and a pipe 34 connected to a gas supply device 32 is connected to the cap 30. The gas supply device 32 supplies a gas (for example, $N_2$) onto the level 28a of the liquid material in the liquid material tank 16. The gas supply device 32 for supplying a gas onto the level 28a of the liquid material in the liquid material tank 16 constitutes a means (device) for applying a pressure to the liquid material 28 in the liquid material tank 16.

Also, a leak hole 36 is provided in the cap 30. A portion of the gas supplied into the liquid material tank 16 is released to the outside from the leak hole 36. Therefore, the pressure in the liquid material tank 16 can be adjusted by the volume of the supplied gas and the volume of leaked gas. In the case where the gas is supplied and leaked, consideration should be given such that the level 28a of the liquid material in the liquid material tank 16 does not directly come into contact with air and the liquid material is not polluted with moisture.

One end of the pipe 18 is connected to a portion of the syringe 12 between the upper end and the lower end thereof, and the other end of the pipe 18 is connected to the lower end of the liquid material tank 16. A filter 38 and a supply valve 40 are arranged in the pipe 18. The filter 38 can be arranged in the liquid material tank 16.

Figure 2:
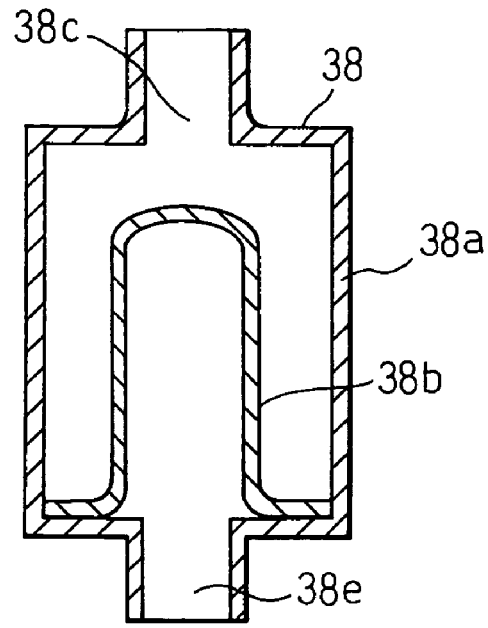
FIG. 2 is a sectional view showing a filter.

FIG. 2 is a sectional view showing the filter 38. The filter 38 includes a filter case 38a and a filter member 38b, the shape of which is a reverse-cup-shape, arranged in the filter case 38a. The filter case 38a has a substantially linear vertical passage 38c. The filter member 38b is made of porous material. It is preferable that the filter member 38b made of porous material has holes of 0.2 μm to 5 μm in diameter. When the hole diameter of the filter member 38b is too large, the filtering effect is lowered, and when the hole diameter of the filter member 38b is too small, a flow of the liquid material is resisted.

The supply valve 40 comprises an electromagnetically operated barrel valve or diaphragm valve. The discharge valve 26 comprises a pneumatically operated syringe valve or plug valve.

Figure 3:
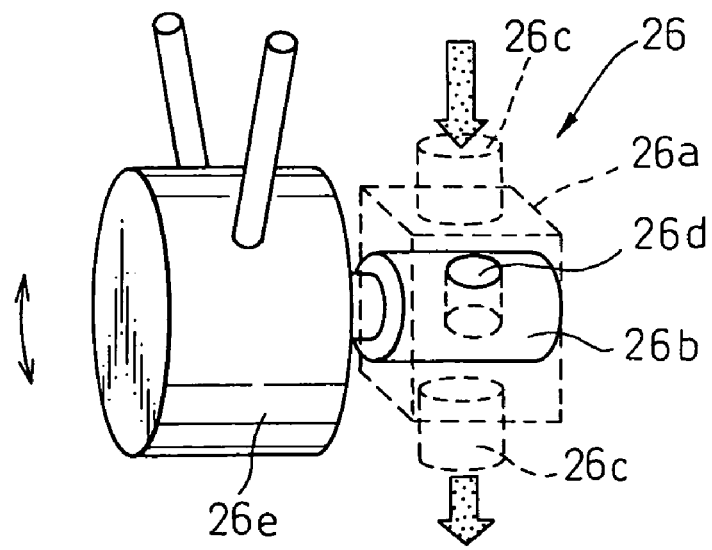
FIG. 3 is a view showing a discharge valve.

FIG. 3 is a view showing an example of the discharge valve 26. The discharge valve 26 includes a valve case 26a and a cylindrical valve member 26b arranged in the valve case 26a. The valve case 26a has a substantially linear vertical passage 26c, and the valve member 26b has a passage 26d penetrating the valve member 26b in the radial direction. The valve member 26b is connected to a pneumatically operating portion 26e, and the valve member 26b is rotated by air introduced into the pneumatically operating portion 26e in the direction of the arrow. When the valve member 26b is driven to one position, the passages 26d and 26c are aligned on a straight line, and the discharge valve 26 is opened. When the valve member 26b is driven to the other position, the passages 26d and 26c are not aligned, so the valve member 26b shuts off the passage 26c, and the discharge valve 26 is closed.

Each member is made of a material which is hard to pollute. For example, the syringe 12 is made of stainless steel, and the liquid material tank 16 is made of PE resin. The pipe 18 is made of a tube of Teflon (registered trade mark). The filter 38 is made of Teflon or stainless steel. The inside of the supply valve 40 is made of Teflon, and the discharge valve 26 is made of a material in which a Teflon coating is provided on a surface of stainless steel.

For example, the liquid material tank 16 is composed of a PE barrel (manufactured by Musashi Engineering), the filter 38 is composed of a pipe insertion filter (manufactured by Nippon Pole) or Furororin-s (manufactured by Nippon Miripoa), the supply valve 40 is composed of a diaphragm valve (manufactured by Musashi Engineering), and the discharge valve 26 is composed of a plug valve (manufactured by NUPRO).

A control unit 42 controls the pulse motor 22 and the gas supply device 32. Further, the control unit 42 controls the supply valve 40 and the discharge valve 26. In this connection, a movement of the plunger 14 can be controlled by an SMPII (manufactured by Musashi Engineering).

Figure 4:
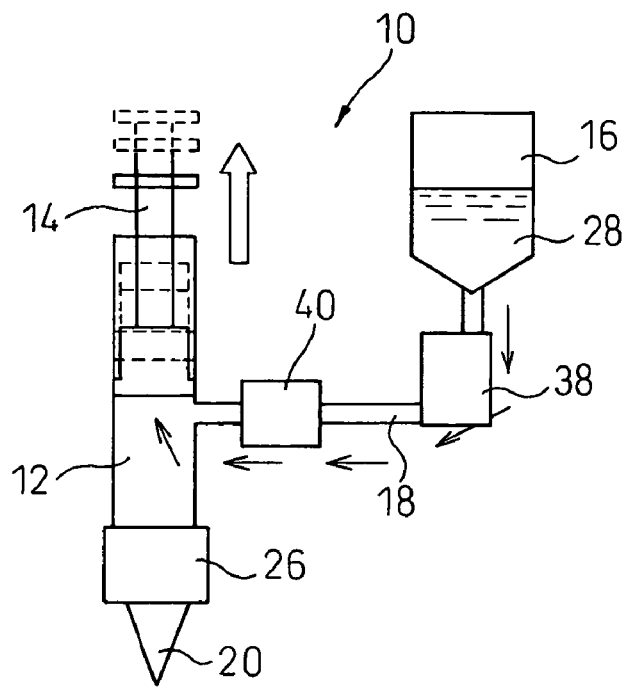
FIG. 4 is a view showing the dispenser in the case in which a liquid material in the liquid material tank is supplied into the syringe.
Figure 5:
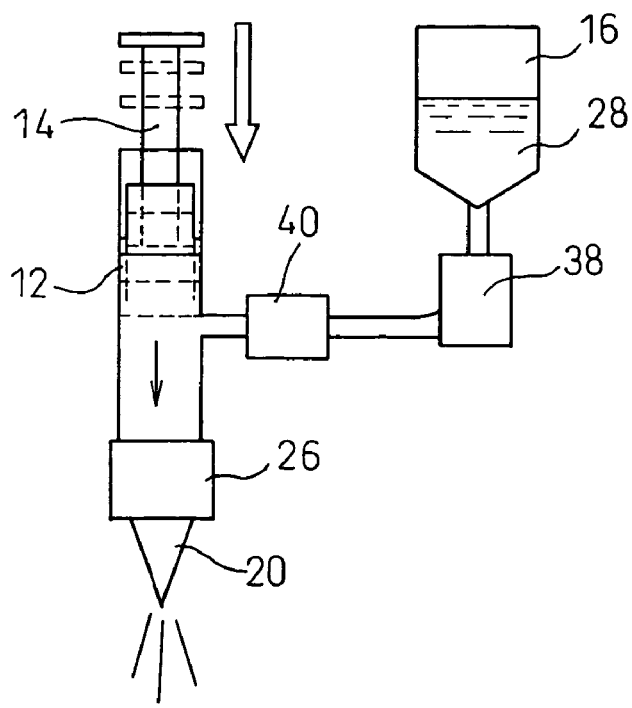
FIG. 5 is a view showing the dispenser in the case in which a liquid material is discharged from the nozzle of the syringe.

FIG. 4 is a view showing the dispenser in the case in which the liquid material 28 is supplied from the liquid material tank 16 to the syringe 12. FIG. 5 is a view showing the dispenser in the case in which the liquid material 28 is discharged from the nozzle 20 of the syringe 12.

In FIG. 4, when the liquid material 28 is supplied from the liquid material tank 16 into the syringe 12, the liquid material discharge valve 26 arranged in the syringe 12 is first closed and, subsequently, the liquid material supply valve 40 arranged in the pipe 18 connecting the syringe 12 with the liquid material tank 16 is opened and the plunger 14 is retracted in the syringe 12. When the plunger 14 is retracted, the liquid material 28 is sucked into the syringe 12. At this time, the pressured gas on the level 28a of the liquid material in the liquid material tank 16 provides pressure to the liquid material 28, so the liquid material 28 can be more stably sucked into the syringe 12.

In FIG. 5, when the liquid material 28 is discharged from the nozzle 20 of the syringe 12, the liquid material supply valve 40 arranged in the pipe 18 connecting the syringe 12 with the liquid material tank 16 is first closed, and subsequently, the liquid material discharge valve 26 arranged in the syringe 12 is opened and the plunger 14 arranged in the syringe 12 is advanced.

In FIGS. 4 and 5, the position of the lower end of the plunger 14 is slightly above the position of the connecting portion between the syringe 12 and the pipe 18. The upper end position and the lower end position of the plunger 14 are substantially constant, and the plunger 14 can repeat the operation of supplying and discharging the liquid material in a substantially constant stroke. Accordingly, the liquid material can be more stably supplied and discharged. When supplying the liquid material, no bubbles are sucked into the syringe 12 from the nozzle 20 or the liquid material tank 16 side. When discharging the liquid material, no bubbles are added to the syringe 12 from the liquid material tank 16 side.

In this way, the supply of the liquid material is carried out in such a state that the level 28a of the liquid material 28 in the liquid material tank 16 is arranged higher than the syringe 12 and the pressure is applied in the liquid material tank 16, so the liquid material 28 can be smoothly moved from the liquid material tank 16 into the syringe 12 and the liquid material can be stably supplied.

In the case where the type of the liquid material 28 is changed or the flow rate of the liquid material is changed by a pressure loss caused in the flow from the liquid material tank 16 to the syringe 12 through the pipe 18, the normally optimum liquid material supply can be realized, by variably controlling the pressure and the moving speed of the plunger.

In the case of supplying the liquid material, the liquid material discharge valve 26 is closed and then the liquid material supply valve 40 is opened, so that the liquid material 28 can be supplied from the liquid material tank 16 into the syringe 12. In the case of discharging the liquid material, the liquid material supply valve 40 is closed and then the liquid material discharge valve 26 is opened, so that the liquid material 28 can be discharged from the syringe 28. Due to the above supplying and discharging motion, no bubbles are mixed into the liquid material passage, and the liquid material can be stably supplied and discharged.

When the filter 38 is arranged between the liquid material tank 16 and the liquid material supply valve 40, it is possible to prevent the liquid material 28 from being polluted, without affecting the accuracy of discharging the liquid material.

By providing the leak hole 36 in the liquid material tank 16, it is possible to prevent the occurrence of pollution caused when the liquid material 28 absorbs moisture.

Figure 6:
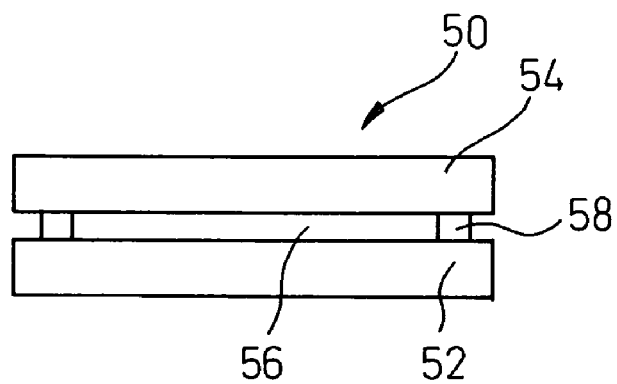
FIG. 6 is a view showing a liquid crystal display device.

FIG. 6 is a view showing a liquid crystal display device. The liquid crystal display device 50 includes a pair of substrates 52 and 54, and liquid crystal 56 inserted between the pair of substrates 52 and 54. Reference numeral 58 is an annular seal.

Figure 7:
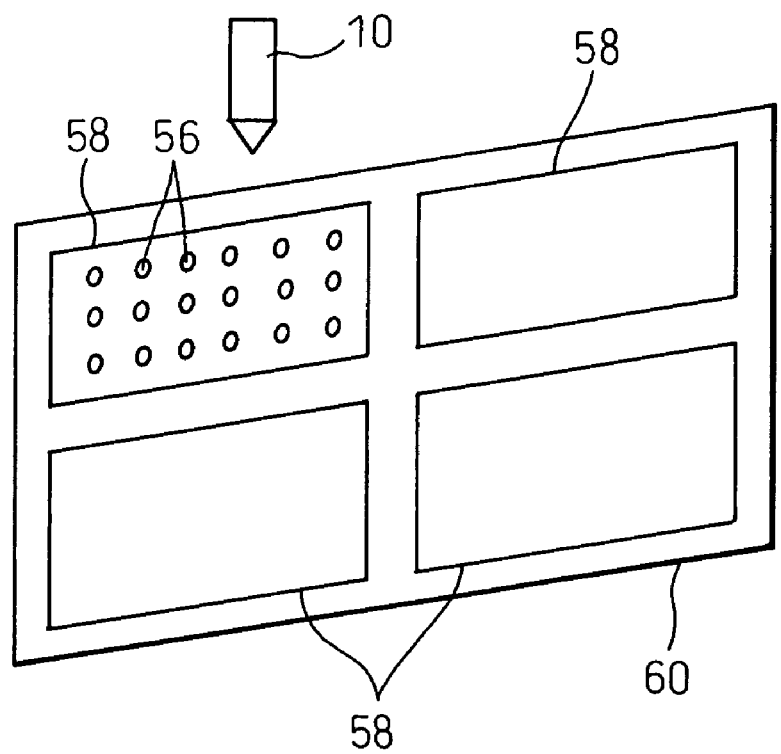
FIG. 7 is a view showing a dripping injection process.

FIG. 7 is a view showing a dripping injection process. A substrate 60 shown in FIG. 7 is a mother glass in which a plurality of substrates are incorporated. Four substrates 52 (or 54), each corresponding to one of substrates shown in FIG. 6, are formed. The liquid material 56 is dripped from the liquid material discharge dispenser 10, shown in FIG. 1, into the region surrounded by the annular seal 58 on the substrate 52. In this case, the liquid crystal 56 corresponds to the liquid material 28 shown in FIG. 1. While moving in the directions X and Y, the dispenser 10 for discharging the liquid material drips the liquid crystal 56 into the region surrounded by the annular seal 18. The sealing agent composing the annular seal 58 is made of UV curable resin or an adhesive resin curable by both UV and heat. Such a sealing agent is coated on the substrate 60 and cured in the later process. On the other substrate, adhesive spacers, which are spacers coated with adhesive, are applied. It is possible to omit the spacer spraying process, by providing polar supports instead of the spacers.

One liquid crystal display device 50 contains 250 mg of liquid crystal, for example. The liquid crystal 56 is dripped at 50 points in the region surrounded by one annular seal 58. Accordingly, a quantity of the liquid crystal per one droplet is 5 mg. The dispenser 10 for discharging the liquid material discharges the liquid crystal of 5 mg at one point. Then, the dispenser 10 for discharging the liquid material moves to the next point and discharges the liquid crystal of 5 mg at the next point. This motion is repeated by 50 times. The dispenser 10 for discharging the liquid material of the present invention can stably discharge such a small quantity of liquid crystal.

The syringe 12 can accommodate 1 to 1.5 g of liquid crystal, for example. The dispenser 10 for discharging the liquid material is used in the following manner. After the dispenser 10 for discharging the liquid material discharges the liquid crystal 50 times in the region surrounded by one annular seal 58, it discharges the liquid crystal 50 times in the region surrounded by the next annular seal 58. However, an operation where the dispenser 10 discharges the liquid crystal 50 times in the region surrounded by one annular seal 58, and successively discharges the liquid crystal 50 times in the region surrounded by the next annular seal 58, is not effected. That is, the dispenser 10 discharges the liquid crystal 50 times in the region surrounded by one annular seal 58, and thereafter, the liquid crystal is supplied into the syringe 12. That is, the liquid material discharge valve 26 is closed, and then the liquid material supply valve 40 is opened and the plunger 14 is retracted, so that the liquid crystal is supplied into the syringe 12 while pressure is being given to the liquid material 28. In this way, the liquid material 28 is supplied from the liquid material tank 16 into the syringe 12. Then, the dispenser 10 discharges the liquid material 50 times in the region surrounded by the next annular seal 58. In the supplying and discharging processes, the plunger 14 moves in the substantially same range in the syringe. Therefore, fluctuation of the quantity of the liquid crystal for each liquid crystal display device is small.

In this way, according to the dripping injection method used for manufacturing the liquid crystal display device, the liquid crystal can be highly accurately dripped. In the dripping injection method of dripping the liquid crystal, problems of abnormal cell thickness and mixing of bubbles (vacuum layer) in the liquid crystal, which are caused by an increase and decrease in the quantity of the liquid crystal, can be solved. Further, problems of local abnormal cell thickness, which are caused by foreign objects mixed into the liquid crystal, can be solved. Furthermore, the liquid crystal is not polluted by moisture. Therefore, it is possible to provide a liquid crystal display device with a good display quality.

Figure 8:
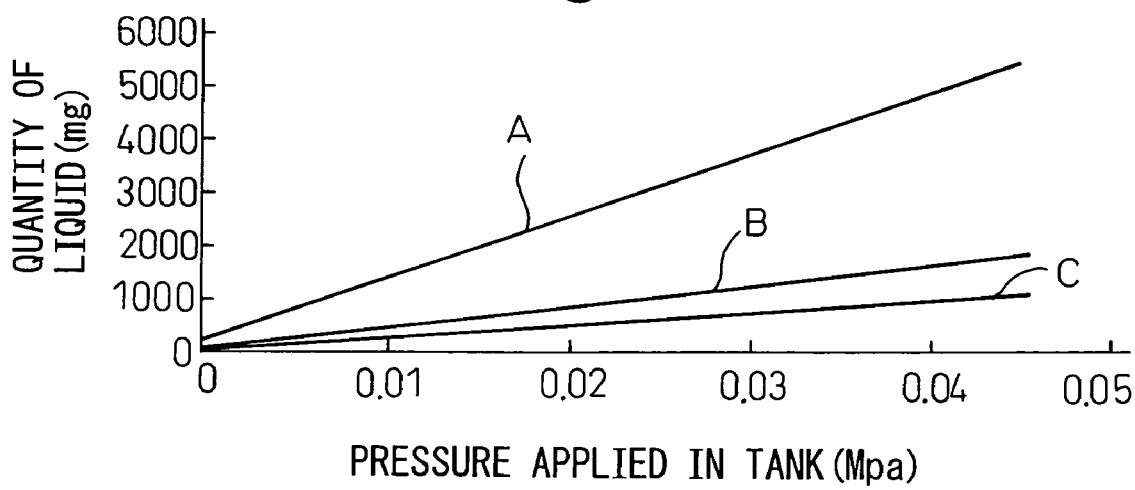
FIG. 8 is a view showing the relationship between the pressure applied in the liquid material tank and the supply of liquid material.

FIG. 8 is a view showing the relationship between the pressure applied in the liquid material tank and the quantity of liquid material. Line A shows a case in which the plunger 14 is moved by a predetermined distance in 127 seconds, line B shows a case in which the plunger 14 is moved by a predetermined distance in 42 seconds, and line C shows a case in which the plunger 14 is moved by a predetermined distance in 25 seconds. As shown by line A, the lower the moving speed of the plunger is, the larger the quantity of supplying the liquid material is increased. The higher the gas pressure is increased, the larger the quantity of supplying the liquid material is increased.

Figure 9:
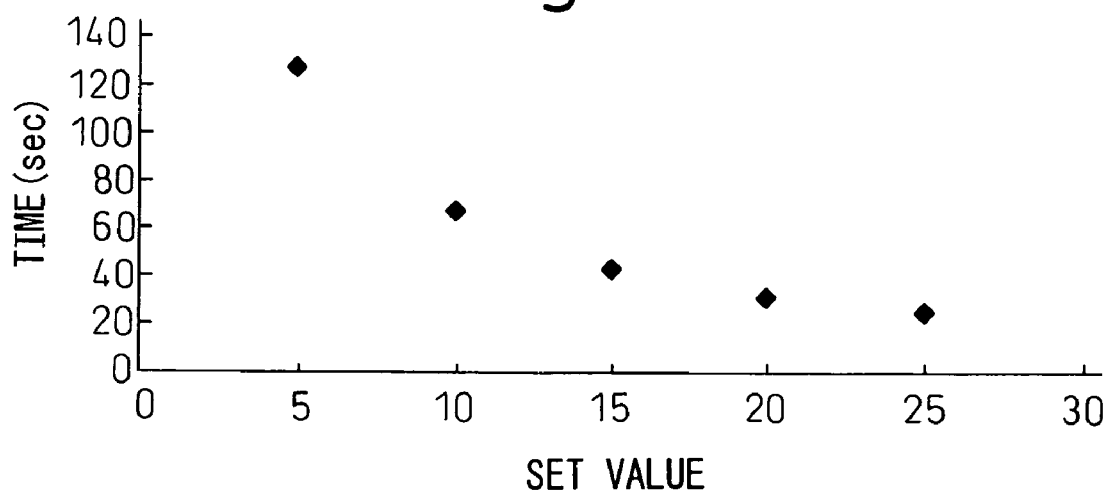
FIG. 9 is a view showing a plunger moving time required for moving a predetermined quantity of liquid material under a predetermined pressure of gas.

FIG. 9 is a view showing a plunger moving time necessary for moving a predetermined quantity of the liquid material under a predetermined pressure of gas. In the figure, the set value is a setting value of the controller, which is related to the speed of the plunger. In this case, the filter 38 is a filter (with a hole diameter of 0.2 μm) manufactured by Nippon Miripoa. The lower the moving speed of the plunger 14, the longer the moving time of the plunger necessary for moving a predetermined quantity of the liquid material.

FIG. 10 is a view showing the relationship between the number of times of discharging the liquid material and the deviation of the discharge. The square points and the lozenge-shaped points in the figure are measurement results under different conditions such as a type of the filter, a pressure given in the tank and a rising speed of the plunger. The square points show that when the number of processing times is increased to a certain value, the deviation of discharge is increased, that is, the square points show a case which is obtained in an unstable condition. The lozenge-points show that even when the number of processing times is increased, the deviation of the discharge is small, that is, the lozenge-points show a case which is obtained in a stable condition.

As shown in FIGS. 8 to 10, when the liquid material is supplied, regarding the supply of the liquid material, it is difficult to set the optimum liquid material supply condition only by the plunger moving speed or only by the pressure given by a gas, and therefore, it is preferable that the plunger moving speed and the pressure given by a gas are controlled in combination while changing them. It is also preferable that the pressure given by a gas and the plunger moving speed can be variably controlled.

The dispenser for discharging a liquid material of the present invention can be applied not only to the dispenser which is used for the drip injection method for manufacturing a liquid crystal display device, but also to the dispenser used for the other purposes.

As explained above, according to the present invention, it is possible to realize a stable supply and discharge of liquid material, and it is possible to prevent a liquid material from being polluted, so that the occurrence of problems caused by the polluted liquid material can be prevented. Therefore, it becomes possible to establish a stable process.

The invention claimed is:

1. A dispenser for discharging a liquid material, comprising:

a syringe having a nozzle at one end thereof;

a plunger engaged in the syringe from the other end of the syringe;

a pipe connected to a portion of the syringe between the one end and the other end of the syringe;

a liquid material tank connected to the other end of the pipe, the liquid material tank being arranged so that a level of a liquid material in the liquid material tank is higher than the syringe; and a device for applying pressure to the liquid material in the liquid material tank, wherein the device for applying pressure to the liquid material in the liquid material tank comprises a device for supplying gas above a level of the liquid material in the liquid material tank, and wherein the liquid material tank has a leak hole at a position higher than the level of the liquid material.

2. A dispenser for discharging a liquid material according to claim 1, wherein the device for applying pressure to the liquid material in the liquid material tank applies and leaks said gas so that the liquid material in the liquid material tank does not directly come into contact with air.

* * * * *